(12) United States Patent
Johnson

(10) Patent No.: US 6,426,603 B1
(45) Date of Patent: Jul. 30, 2002

(54) MOTOR CONTROLLER HAVING AUTOMATIC PERMANENT SINGLE PHASE WIRING DETECTION

(75) Inventor: Lynn Stewart Johnson, Aurora, IL (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 09/604,847

(22) Filed: Jun. 28, 2000

(51) Int. Cl.[7] .................................................. H02P 7/00
(52) U.S. Cl. ....................... 318/434; 318/434; 318/490; 361/23; 361/88; 324/512; 324/772
(58) Field of Search ................................ 318/490, 434; 361/23, 21, 88, 91.1; 324/512, 522, 772

(56) References Cited

U.S. PATENT DOCUMENTS

| | | | | |
|---|---|---|---|---|
| 4,384,243 A | * | 5/1983 | Muskovac | 318/729 |
| 4,477,760 A | * | 10/1984 | Kuznetsov | 318/773 |
| 5,153,489 A | * | 10/1992 | Unsworth et al. | 318/490 |
| 5,469,351 A | * | 11/1995 | Masrur et al. | 363/56 |
| 5,574,346 A | * | 11/1996 | Chavan et al. | 318/434 |
| 5,945,797 A | * | 8/1999 | Johnson | 318/490 |
| 6,038,114 A | * | 3/2000 | Johnson | 361/23 |
| 6,072,674 A | * | 6/2000 | Johnson | 361/23 |
| 6,169,383 B1 | * | 1/2001 | Johnson | 318/771 |
| 6,184,795 B1 | * | 2/2001 | Johnson | 340/648 |

* cited by examiner

*Primary Examiner*—Robert E. Nappi
*Assistant Examiner*—Rina I. Duda

(57) ABSTRACT

Problems associated with delta motors and motor controllers being subjected to overcurrent conditions as well as with time consuming troubleshooting are eliminated in a motor controller that automatically inhibits operation of the delta motor when it detects permanent single phase wiring errors that occur during the installation process.

7 Claims, 5 Drawing Sheets

MOTOR CONTROLLER HAVING AUTOMATIC PERMANENT SINGLE PHASE WIRING DETECTION

FIELD OF THE INVENTION

This invention relates to motor controllers and more particularly, to a delta motor controller that automatically detects when a delta motor system has been wired with permanent single phase connections.

BACKGROUND OF THE INVENTION

A delta motor system typically includes a delta motor, a three phase power source, a fault contactor and a motor controller. During start up, delta motors often experience potentially damaging high inrush currents and starting torques. This can adversely effect the performance of the motor drive and increase general wear and tear leading to higher maintenance costs. In addition, current peaks during motor startup can also cause voltage disturbances in the power supply.

Motor controllers are typically used to restrict the motor torque and reduce the high starting currents by controlling the application of voltage from the three phase power source to the delta motor. The motor controller generally includes a set of three control switches that are connected between the line voltage terminals of the three phase power source and the windings of the delta motor. The motor controller regulates the voltage from the three phase power source to the delta motor by selectively opening and closing the three control switches. The proper operation of the delta motor is dependent on the proper regulation of the control switches.

The fault contactor is commonly used to disconnect the three phase power source from the delta motor in the event that the delta motor system malfunctions. The fault contactor includes a set of three contacts that are also connected between each of the delta motor windings and the line voltage terminals. Each of the delta motor windings are intended to receive the fault contact connection on one side and the control switch connection on the other side. Alternatively, the fault contactor function can also be done with a shunt trip circuit breaker, an in-line contactor, or fuses.

The motor controller's internal timing mechanisms are specifically designed to regulate the application of specific line voltages from the three phase power source to specific delta motor windings based on a predesignated wiring configuration. Conventional electrical leads are typically used to connect the delta motor windings to the control switches and to the fault contacts. Since the electrical leads providing connection to the delta motor terminals are not always clearly marked, mistakes in wiring the delta motor system are common.

If the motor winding leads are connected in the wrong positions, such as a permanent single phase connection, then it is possible for current to flow through one of the motor windings. With a permanent single phase connection one of the motor windings is connected between two fault contactor contacts to two of the line terminals. There is no control switch to control supply to the winding. As a result, the winding is permanently connected in single phase as long as the fault contactor contacts are closed. The overload relay operating the fault contactor may not detect this current flow. The motor winding could be damaged.

Clearly it is desirable to use a motor controller that automatically detects a fault condition if the motor system has been incorrectly wired. One example is a single motor winding is wired in a permanent single phase configuration. Detecting this fault condition prior to operating the delta motor enables the user to correct the faulty wiring prior to subjecting the delta motor and the motor controller to potentially damaging current conditions. In addition, automatic detection of these faults reduces troubleshooting time and associated expenses. The present invention seeks to achieve these objectives.

SUMMARY OF THE INVENTION

It is a principal object of this invention to provide a new and improved motor controller that automatically detects when a delta motor is wired incorrectly within a motor system. More specifically, it is an object of the invention to provide a motor controller that detects the faulty wiring prior to starting the delta motor so that the incorrect wiring can be corrected and the delta motor and the motor controller are not subjected to potentially damaging current conditions. It is also an object of the invention to facilitate the installation process so that troubleshooting time and associated expenses are reduced.

An exemplary embodiment of the invention achieves the foregoing objects in a motor controller for use in a motor system including a multiphase power source having three supply lines and a delta motor having three windings.

The motor controller includes a plurality of switching means and an error detecting means. Each of the switching means is intended to be operatively connected in series with a selected one of the windings and between an associated selected pair of the supply lines. The error detecting means is operatively connected across each of the switching means to detect a fault condition if at least one of the windings is permanently connected in single phase between a pair of supply lines.

It is a feature of the invention that an indicating means is connected to the error detecting means to generate an indication in response to the fault condition.

In one embodiment, the plurality of switching means comprise solid state devices.

In another embodiment, the plurality of switching means comprise SCRs or triacs.

In another form of the invention, an error detecting means is operatively connected to each of the switching means to detect a fault condition if at least one of first leads for motor windings is operatively connected to one of the supply lines, wherein the winding associated with the at least one of the first leads is permanently connected in single phase between a pair of supply lines.

Other objects and advantages of the invention will become apparent from the following specification taken in conjunction with the accompanying drawings.

DETAILED DESCRIPTION OF THE DRAWINGS

Figure 1:
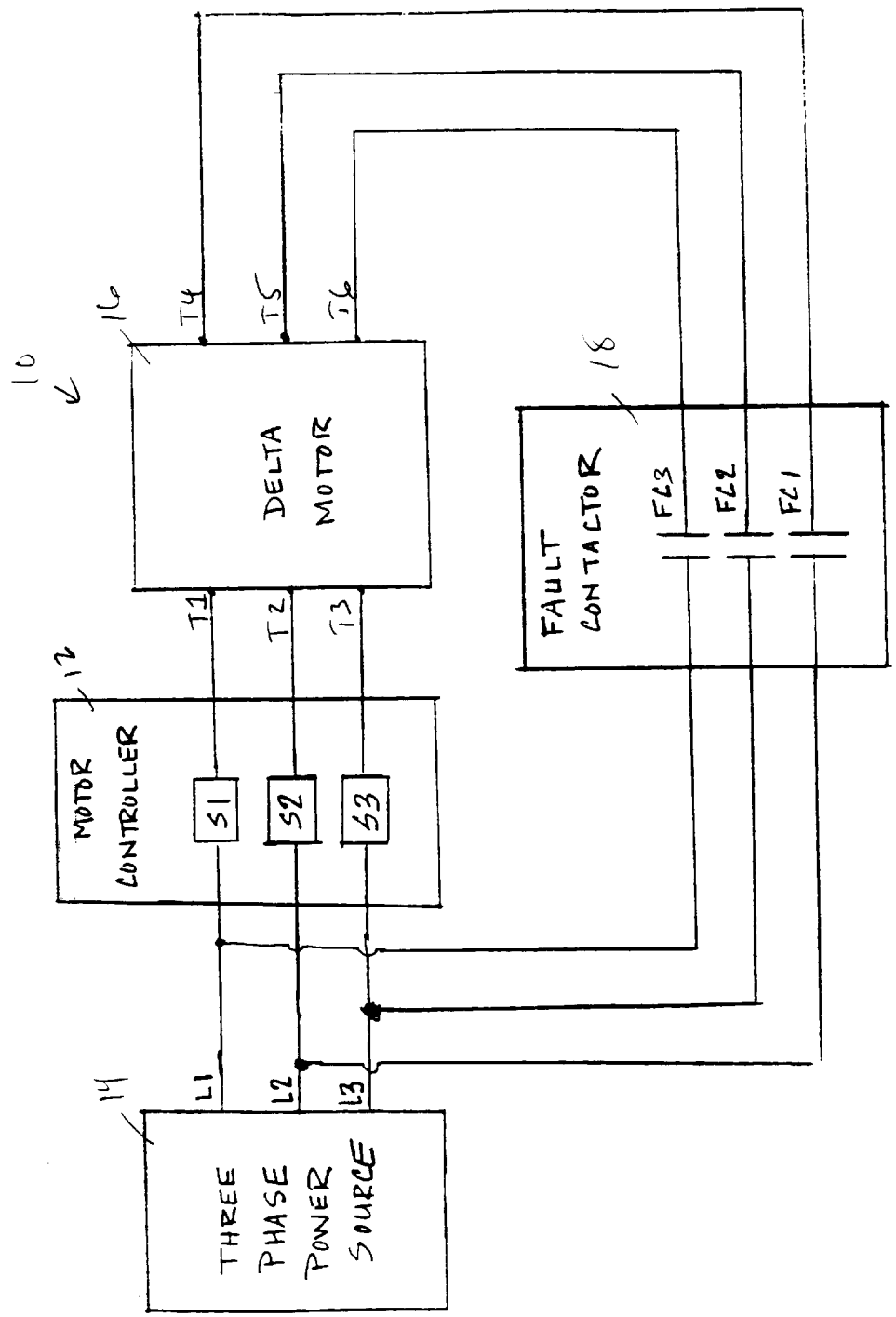
FIG. 1 shows a delta motor system including a prior art motor controller.

A diagram of a conventional delta motor system 10 including a prior art motor controller 12 is depicted in FIG. 1. The illustrated delta motor system 10 includes a three phase power source 14, a delta motor 16, a fault contactor 18 and the motor controller 12. The motor controller 12 generally includes a set of three control switches S1, S2, S3 for providing electrical connection between line voltage terminals L1, L2, L3 of the three phase power source 14 and respective motor terminals T1, T2, T3 of the delta motor 16. The motor controller 12 regulates the voltage applied to the delta motor 16 by selectively opening and closing the three control switches S1, S2, S3. The proper operation of the delta motor 16 is dependent upon the proper regulation of the control switches S1, S2, S3.

The fault contactor 18 also includes a set of three contacts FC1, FC2, FC3 that are pre-connected between the line voltage terminals L1, L2, L3 and opposite terminals T4, T5, T6 of the delta motor 16 in a preferred embodiment, as shown in FIG. 1. Alternatively, the fault contactor 18 may be connected between the line voltage terminals L1, L2, L3 and the controller 12, as is known. The fault contactor 18 is used to disconnect the three phase power source 14 from the delta motor 16 in the event that the delta motor system 10 experiences a malfunction.

Figure 2:
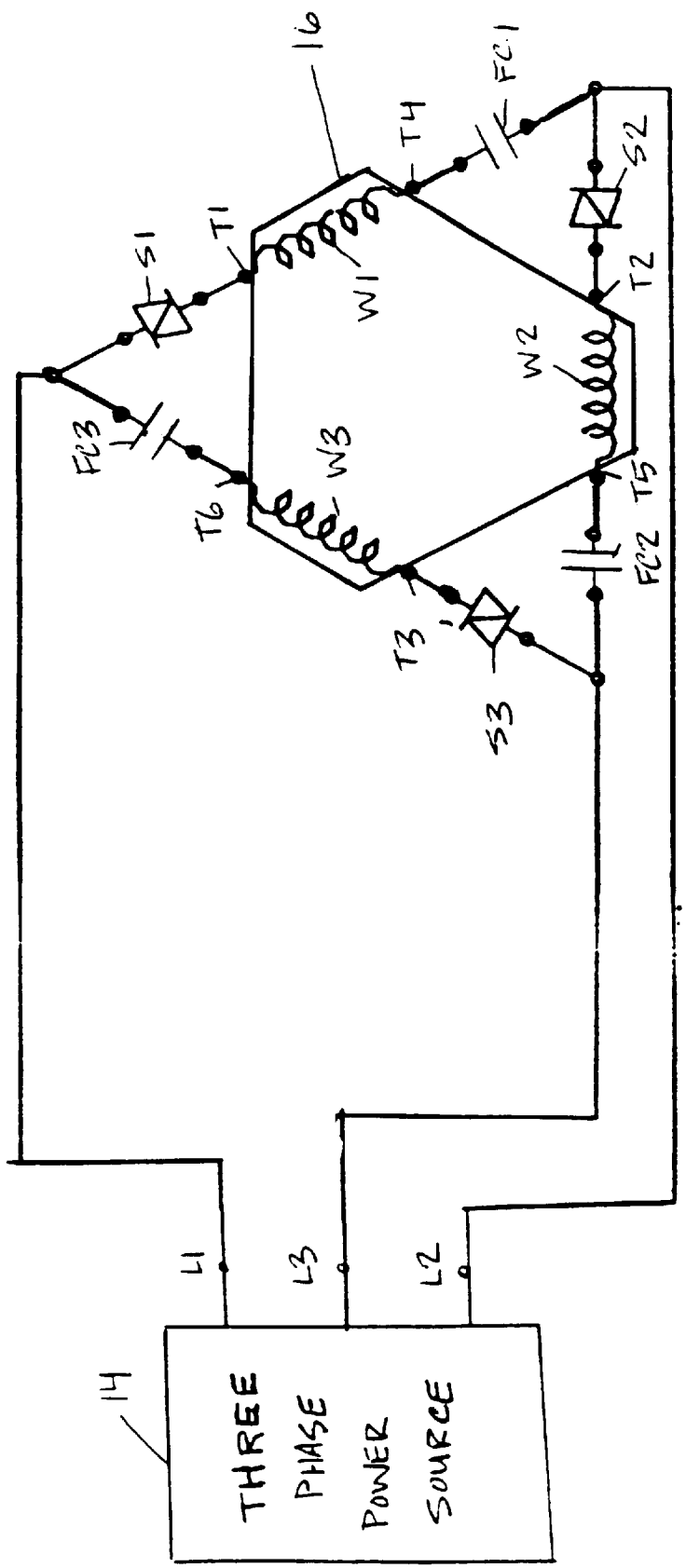
FIG. 2 schematically illustrates the relationships between the delta motor windings, the motor controller control switches and the fault contactor contacts for proper motor controller operation.

FIG. 2 illustrates in detail proper relationships between delta motor windings W1, W2, W3, the line voltage terminals L1, L2, L3, the fault contacts FC1, FC2, FC3 and the motor controller control switches S1, S2, S3 for proper motor controller operation with the illustrated embodiment. The motor controller's internal timing mechanisms are specifically designed to regulate the application of the three phase voltage from the three phase power source 14 to the delta motor windings W1, W2, W3 based on this predesignated wiring configuration.

The delta motor 16 consists of three windings W1, W2, W3 arranged in a delta configuration. Each winding W1, W2, W3 has a pair of associated motor terminals T1 and T4, T2 and T5, T3 and T6, respectively, that provide electrical connection to either side of each individual winding W1, W2, W3. The terminals T1, T2 and T3 are designated for connection to the line voltage terminals L1, L2 and L3, respectively, via the control switches S1, S2 and S3 respectively. The terminals T4, T5 and T6 are designated for connection to the line voltage terminals L2, L3 and L1, respectively, via respective fault contacts FC1, FC2 and FC3.

The overall layout of the control switches and the windings can be described as follows in the illustrated embodiment: the first control switch S1, the first winding W1, and the first fault contact FC1 are connected in series across line voltage terminals L1 and L2; the second control switch S2, the second winding W2, and the second fault contact FC2 are connected in series across line voltage terminals L2 and L3; and the third control switch S3, the third winding W3, and the third fault contact FC3 are connected in series across line voltage terminals L3 and L1. It is essential that the motor terminals T1, T2, T3, T4, T5, T6 be wired with the appropriate control switches S1, S2, S3 and the appropriate fault contacts FC1, FC2, FC3 across the appropriate line voltage terminals L1, L2, L3 to enable the motor controller 12 to perform its motor torque restricting and current limiting functions.

Conventional leads are typically used to connect the delta motor windings W1, W2, W3 to the control switches S1, S2, S3 and to the fault contacts FC1, FC2, FC3. The electrical leads providing connection to the delta motor terminals T1, T2, T3, T4, T5 and T6 are not always clearly marked. As a result wiring mistakes during the installation process of the delta motor system 10 are common.

Figure 3:
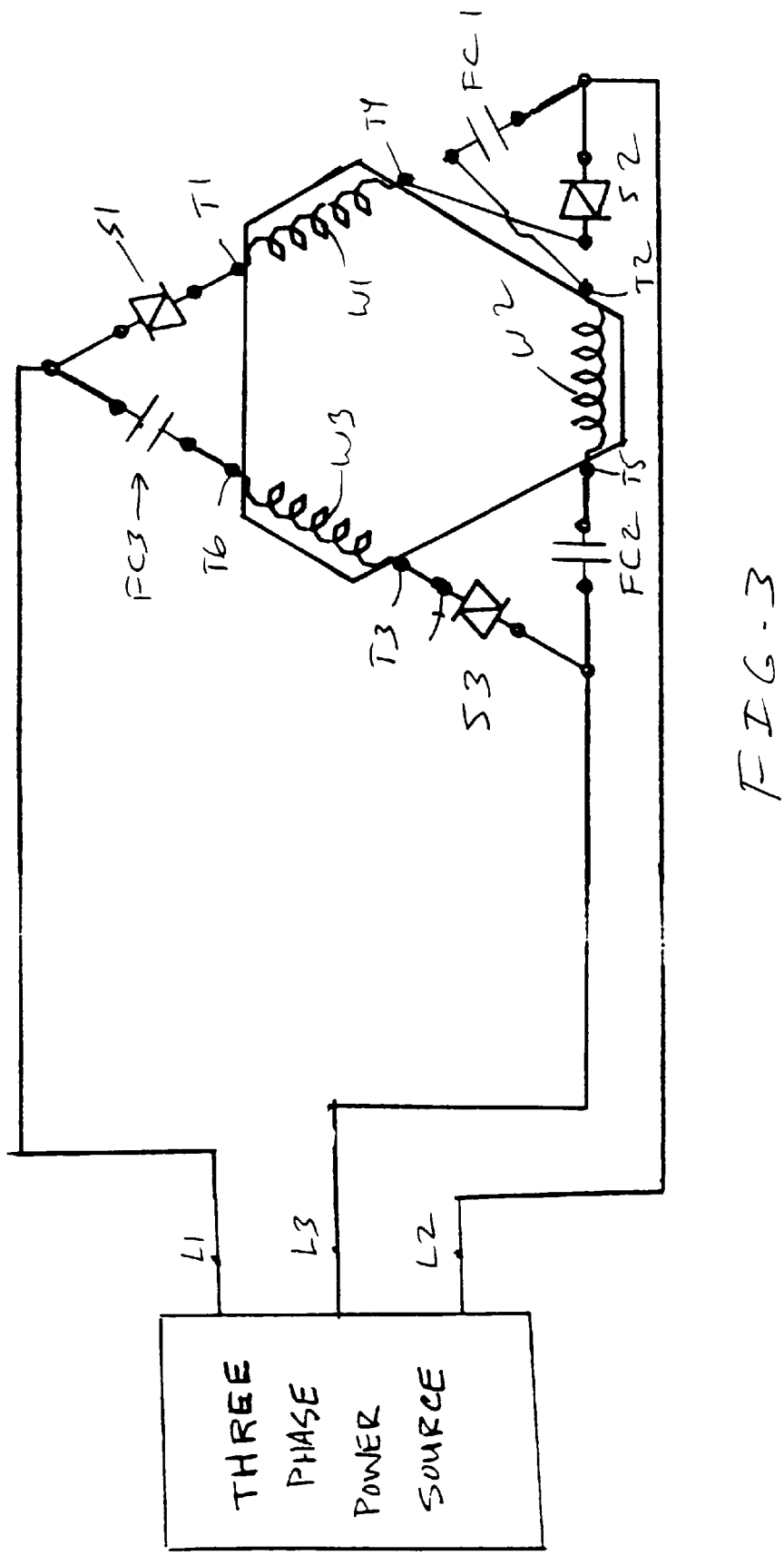
FIG. 3 schematically illustrates the relationships between the delta motor windings, the motor controller control switches and the fault contactor contacts with one possible abnormal connection resulting in a permanent single phase fault condition.

FIG. 3 depicts an example of a permanent single phase wiring configuration where the second winding W2 has been permanently connected in a single phase configuration. The illustrated single phase configuration can be described as follows: the second winding W2 has both terminals T2 and T5 electrically coupled through respective fault contacts FC1 and FC2 between the line voltage terminals L2 and L3. Because the fault contacts are normally closed, the second winding W2 is permanently connected to single phase power.

Figure 4:
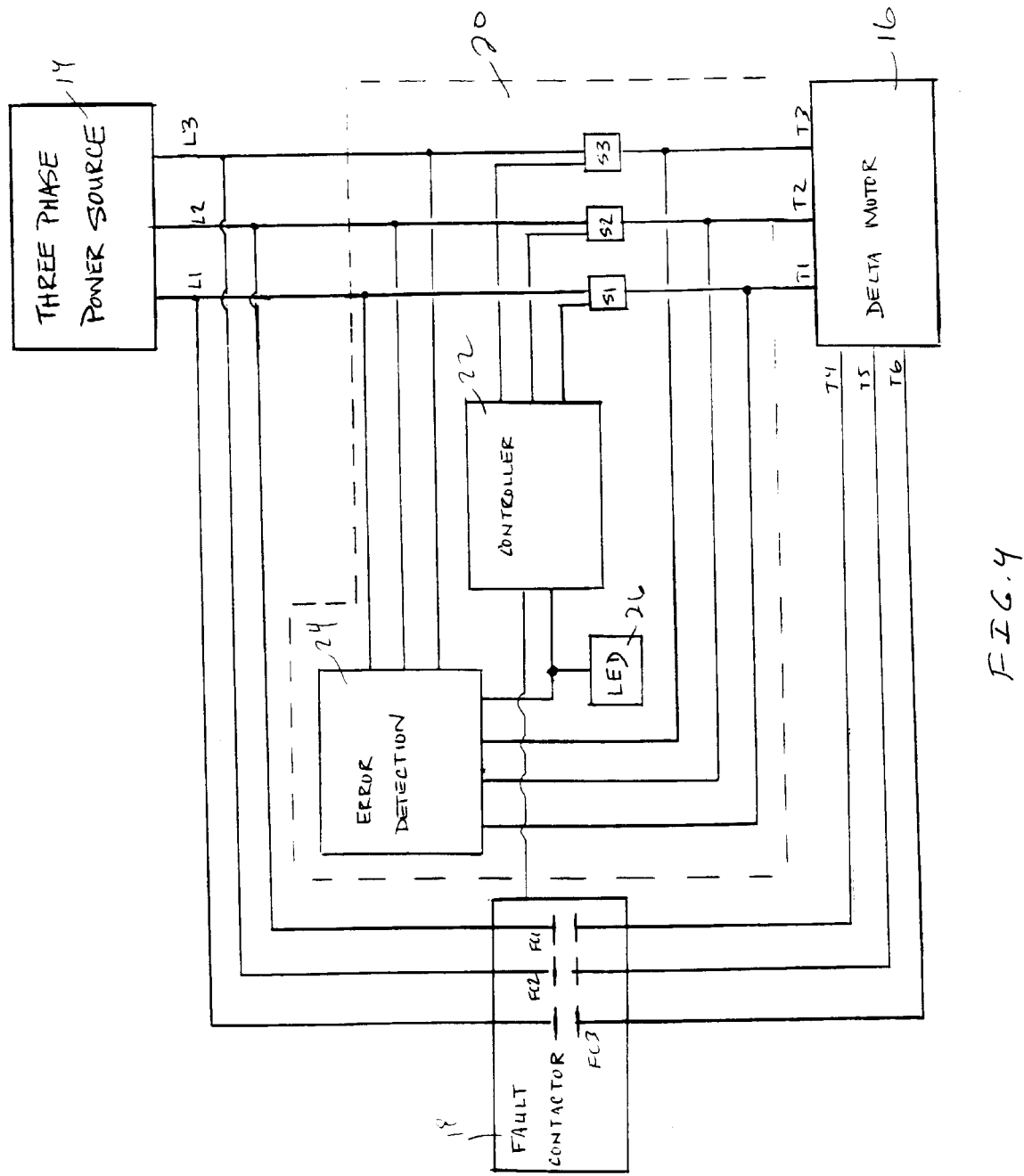
FIG. 4 is a block diagram of a motor controller according to the invention connected within the delta motor system.

A motor controller 20 according to the invention, shown in FIG. 4, detects a delta motor winding wired in a permanent single phase configuration.

A controller 22, connected to each of the control switches S1, S2, S3 and an error detection block 18, controls the application of voltages from the three phase power source 14 to the delta motor 16 by controlling the operation of the control switches S1, S2, S3. The controller 22 responds to the fault signals generated by the error detection block 24 by inhibiting operation of the delta motor 16. In addition, the error detection block 24 also directs the fault signal to an indicator such as, for example, an LED 26. The LED 26 provides the user with visual indication of the specific type of wiring error detected. As is apparent, the error detection block 24 could detect other types of fault conditions.

Solid state switches such as SCRs or triacs are used for the control switches S1, S2, S3 in a preferred embodiment of the invention. However, the use of alternative switching mechanisms are also considered to be within the scope of the invention. In addition, in the illustrated embodiment, the controller 22 comprises a programmed micro controller. It should be noted that alternative hardware or software implementations of the controller 22 are also within the spirit of the invention. The error detection block 24 can be implemented with a logic circuit or using software in the programmed micro controller. If implemented as a logic circuit, the discrete signals are supplied to the controller 22. If implemented as software, then interface circuits connect the detected voltage values to the micro controller. The error detection block 24 is connected across the three switches S1–S3 and accepts the line voltages from the line terminals L1, L2, L3 and the motor winding voltages at the three motor terminals T1, T2, T3 as inputs. The error detection block compares the line voltages at the terminals L1–L3 relative to one another and relative to the motor voltages at the motor terminals T1–T3, as described more specifically below.

Figure 5:
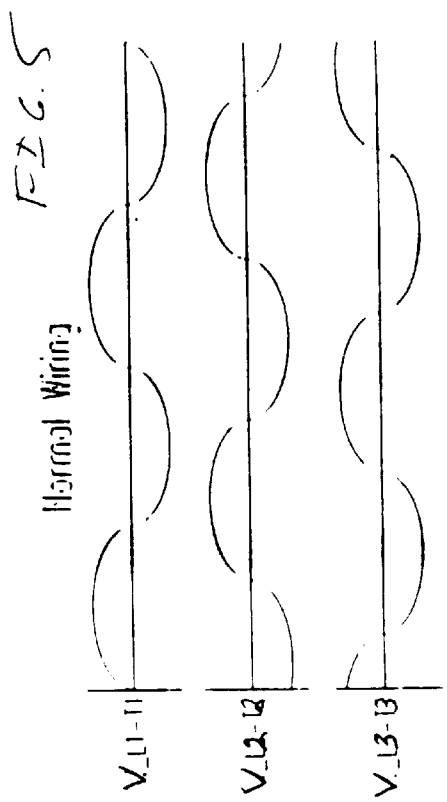
FIG. 5 illustrates the waveforms for voltages across motor controller switches for a correctly wired delta motor system.

FIG. 5 illustrates the waveforms for the voltages V_L1–T1, V_L2–T2, V_L3–T3 across the respective switches S1, S2, S3 for a correctly wired delta motor system 10. When the motor 16 is de-energized (off) and connected to the power source 14, all of the following conditions are true:

$$V\_L1\text{-}T1 = V\_L1\text{-}L2;$$

$$V\_L2\text{-}T2 = V\_L2\text{-}L3;$$

and $$V\_L3\text{-}T3 = V\_L3\text{-}L1.$$

The error detection block 24 decodes the sensed voltages to verify that all of these conditions are true.

If the motor 16 is de-energized and connected in a permanent single phase configuration, then one of the following conditions is true:

$$V\_L1\text{-}T1 = V\_L1\text{-}L2,$$

$$V\_L2\text{-}T2 = -V\_L1\text{-}T2 = -V\_L1\text{-}L2,$$

and $$V\_L3\text{-}T3 = V\_L3\text{-}L1;$$

or $$V\_L1\text{-}T1 = V\_L1\text{-}L2,$$

$$V\_L2\text{-}T2 = V\_L2\text{-}L3,$$

and $$V\_L3\text{-}T3 = -V\_L2\text{-}T2 = -V\_L2\text{-}L3;$$

or $$V\_L1\text{-}T1 = -V\_L3\text{-}T3 = -V\_L3\text{-}L1,$$

$$V\_L2\text{-}T2 = V\_L2\text{-}L3,$$

and $$V\_L3\text{-}T3 = V\_L3\text{-}L1.$$

The error detection block 24 decodes the sensed voltages to determine if any of these conditions are true and, if so, then a fault condition exists. If a fault condition exists, then the controller 22 de-energizes the fault contactor 18 and indicates a fault to the user with the LED 26. The controller also disables operation of the switches S1–S3.

Figure 6:
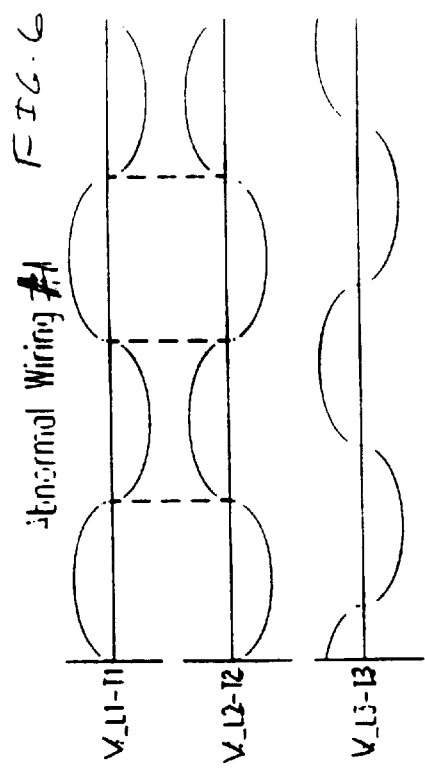
FIG. 6 illustrates the waveforms for voltages across motor controller switches for a first abnormally wired delta motor system with a permanent single phase fault condition.
Figure 8:
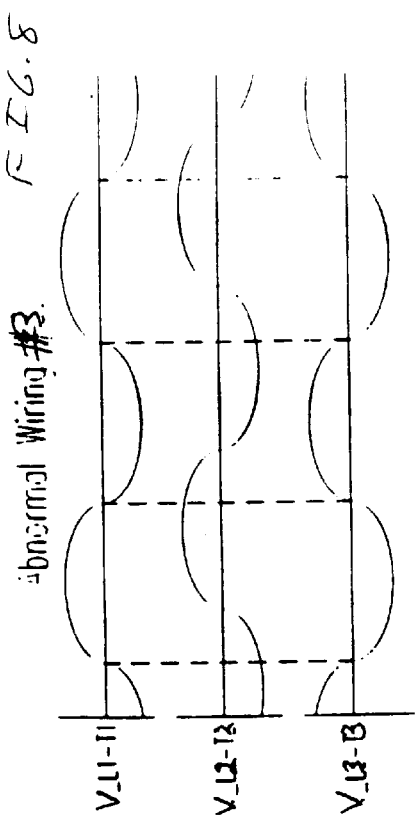
FIG. 8 illustrates the waveforms for voltages across motor controller switches for a third abnormally wired delta motor system with a permanent single phase fault condition.
Figure 7:
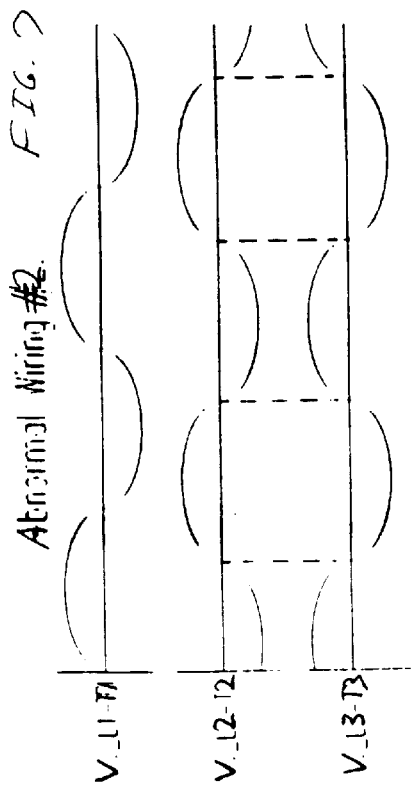
FIG. 7 illustrates the waveforms for voltages across motor controller switches for a second abnormally wired delta motor system with a permanent single phase fault condition.

FIGS. 6–8 illustrate waveforms for the voltages V_L1–T1, V_L2–T2, V_L3–T3 across the respective switches S1, S2, S3 for these three abnormal wiring configurations of the delta motor system 10. As is apparent, in each abnormal configuration, the voltages across two of the switches are equal, but of opposite polarity. For example, in the abnormal wiring condition of FIG. 6, the voltage across the first switch S1 is equal the voltage across the second switch S2, but of opposite polarity. Also, referring to the above conditions, the voltage across one of the individual switches is equal, but of opposite polarity, to voltage between the first terminal of the winding intended to be connected to the individual switch and one of the supply lines not intended to be connected to the individual switch.

Thus, the motor controller 20 uses the error detection block 24 to identify if the delta motor system 10 is wired in a permanent single phase configuration. Upon detection of this abnormal wiring configuration, the error detection block 24 generates a fault signal indicative of the wiring error. The fault signal is routed to the LED 26 to provide notice of the incorrect wiring configuration to the user and to the controller 22 which in turn inhibits operation of the delta motor 16.

It will be appreciated that since the entire error detection process occurs prior to actually turning on the delta motor 16, the delta motor 16 and the motor controller 20 are never exposed to potentially damaging increased motor torques and overcurrent conditions.

As is apparent, the motor system connections will be modified for the alternative fault contactor connections mentioned above. Nevertheless, the error detection circuit 24 operates as disclosed herein.

The foregoing disclosure of specific embodiments is intended to be illustrative of the broad concepts comprehended by the invention.

What is claimed is:

1. For use in a motor system including a multiphase power source having three supply lines and a delta motor having three windings, each winding having an associated first lead and an associated second lead, the second lead of each winding intended to be operatively connected to a selected supply line, a motor controller comprising:

a plurality of switching means each intended to be operatively connected between a selected one of the supply lines and the first lead of a selected one of the windings; and an error detecting means operatively connected to each of the switching means to detect a fault condition if at least one of the first leads is operatively connected to one of the supply lines, wherein the winding associated with the at least one of the first leads is permanently connected in single phase between a pair of the supply lines, wherein the error detecting means is operable to detect voltages across each of the switching means and voltages across the first and second supply lines, the second and third supply lines and the third and first supply lines, wherein the error detecting means includes a decoding means for detecting the fault condition if the voltages across two of the switching means are equal, but of opposite polarity.

2. The motor controller according to claim 1, wherein the error detecting means includes a decoding means for detecting the fault condition if the voltages across one of the individual switching means is equal, but of opposite polarity, to voltage between the first lead of the winding intended to be connected to the individual switching means and one of the supply lines not intended to be connected to the individual switching means.

3. The motor controller according to claim 1, further comprising a fault contactor having fault contacts connected in series with one of the windings and switching means and wherein the motor controller de-energizes the fault contactor if a fault condition exists.

4. The motor controller according to claim 1, including an indicating means connected to the error detecting means for generating a fault indication in response to the fault condition.

5. The motor controller according to claim 1, wherein the plurality of switching means comprise solid state devices.

6. The motor controller according to claim 1, wherein the plurality of switching means comprise SCRs.

7. The motor controller according to claim 1, wherein the plurality of switching means comprise triacs.

* * * * *